(12) United States Patent
Soualle et al.

(10) Patent No.: US 10,348,344 B2
(45) Date of Patent: Jul. 9, 2019

(54) NOISE DISTRIBUTION SHAPING FOR SIGNALS, PARTICULARLY CDMA SIGNALS, WITH MITIGATION OF ARTIFACT SIGNALS

(71) Applicant: Airbus DS GmbH, Taufkirchen (DE)

(72) Inventors: Francis Soualle, Munich (DE); Mathieu Cattenoz, Malakoff (FR)

(73) Assignee: AIRBUS DS GMBH, Taufkirchen (DE)

( * ) Notice: Subject to any disclaimer, the term of this patent is extended or adjusted under 35 U.S.C. 154(b) by 0 days.

(21) Appl. No.: 15/377,273

(22) Filed: Dec. 13, 2016

(65) Prior Publication Data
US 2017/0170854 A1    Jun. 15, 2017

(30) Foreign Application Priority Data

Dec. 15, 2015    (EP) .................................... 15003562

(51) Int. Cl.
*H04B 1/10*        (2006.01)
*H04B 17/27*       (2015.01)
(Continued)

(52) U.S. Cl.
CPC ............ *H04B 1/1027* (2013.01); *G01S 19/24* (2013.01); *G01S 19/38* (2013.01); *H04B 1/16* (2013.01);
(Continued)

(58) Field of Classification Search
CPC .. H04B 1/1027; H04B 17/318; H04B 17/336; H04B 17/364
(Continued)

(56) References Cited

U.S. PATENT DOCUMENTS 3,978,412 A  *  8/1976  Frerking ................ H03G 3/345
                                                      455/222
4,327,446 A  *  4/1982  Dressler ................ H03G 3/345
                                                      455/223
(Continued)

FOREIGN PATENT DOCUMENTS

EP          14290171.9       12/2015

OTHER PUBLICATIONS

European Search Report, dated Jun. 3, 2016, priority document.
(Continued)

*Primary Examiner* — Emmanuel Bayard
(74) *Attorney, Agent, or Firm* — Greer, Burns & Crain, Ltd.

(57) ABSTRACT

Noise distribution shaping for signals, particularly for the application in receivers for CDMA signals. A method for noise distribution shaping for signals comprises the acts of receiving a signal of interest from a signal transmitter, detecting whether the received signal of interest is present, and if the received signal of interest is present iteratively performing the following acts of adapting at least one blanking threshold or the received signal of interest according to an offset value depending on the amplitude of the received signal of interest, and generating a blanking control signal by comparing the received signal of interest with the at least one blanking threshold, modifying the noise distribution of the received signal of interest by applying blanking of the received signal of interest under control of the blanking control signal.

16 Claims, 3 Drawing Sheets

(51) Int. Cl.

| | | |
|---|---|---|
| *H04B 17/318* | (2015.01) | |
| *H04B 17/336* | (2015.01) | |
| *H04B 17/364* | (2015.01) | |
| *H04B 1/16* | (2006.01) | |
| *G01S 19/38* | (2010.01) | |
| *H04B 1/7097* | (2011.01) | |
| *G01S 19/24* | (2010.01) | |
| *G01S 19/30* | (2010.01) | |

(52) U.S. Cl.
CPC .......... *H04B 1/7097* (2013.01); *H04B 17/27* (2015.01); *H04B 17/318* (2015.01); *H04B 17/336* (2015.01); *H04B 17/364* (2015.01); *G01S 19/30* (2013.01)

(58) Field of Classification Search
USPC .................................................. 375/347–351
See application file for complete search history.

(56) References Cited

U.S. PATENT DOCUMENTS

| | | | | |
|---|---|---|---|---|
| 4,334,317 | A * | 6/1982 | Beesley | H03G 3/345 455/194.1 |
| 4,510,624 | A * | 4/1985 | Thompson | H03G 3/345 455/223 |
| 4,704,736 | A * | 11/1987 | Kasser | H03G 3/345 375/351 |
| 4,792,806 | A * | 12/1988 | Bent | G01S 1/24 342/388 |
| 5,212,827 | A * | 5/1993 | Meszko | H03G 3/345 455/219 |
| 5,537,675 | A * | 7/1996 | Bond | H03G 3/345 375/351 |
| 5,794,136 | A * | 8/1998 | Buchwald | H03G 3/345 455/222 |
| 5,889,821 | A * | 3/1999 | Arnstein | H03G 3/345 342/358 |
| 5,890,059 | A * | 3/1999 | Shoemaker | H03G 3/345 455/223 |
| 6,091,013 | A * | 7/2000 | Waller, Jr. | G10H 3/186 84/663 |
| 6,091,765 | A * | 7/2000 | Pietzold, III | H03G 3/345 375/219 |
| 6,347,146 | B1 * | 2/2002 | Short | H03G 3/345 381/15 |
| 6,397,050 | B1 * | 5/2002 | Peterson | H03G 3/344 455/212 |
| 6,795,423 | B1 * | 9/2004 | Sezgin | H04B 1/71 370/335 |
| 6,810,266 | B1 * | 10/2004 | Ecklund | H04B 1/406 375/216 |
| 7,133,478 | B2 * | 11/2006 | Vierthaler | H04B 1/1027 375/285 |
| 7,260,163 | B2 | 8/2007 | Li et al. | |
| 7,805,120 | B2 * | 9/2010 | Altizer | H03G 3/345 455/218 |
| 7,907,923 | B2 * | 3/2011 | Hausdorf | H03G 3/344 375/285 |
| 8,018,379 | B1 * | 9/2011 | Sun | G01S 19/33 342/357.73 |
| 2003/0012127 | A1 * | 1/2003 | Kolze | H04B 1/71 370/204 |
| 2003/0043925 | A1 * | 3/2003 | Stopler | H04L 25/067 375/254 |
| 2004/0085891 | A1 * | 5/2004 | Henriksson | H03G 3/345 370/203 |
| 2004/0203551 | A1 * | 10/2004 | Li | H03G 3/345 455/296 |
| 2004/0239559 | A1 * | 12/2004 | King | G01S 19/21 342/357.59 |
| 2005/0047489 | A1 * | 3/2005 | Yousef | H04B 1/71 375/148 |
| 2007/0049227 | A1 * | 3/2007 | Su | H04B 1/109 455/223 |
| 2007/0143771 | A1 * | 6/2007 | Zhou | G11B 7/00375 720/658 |
| 2007/0280088 | A1 * | 12/2007 | Lin | G11B 20/10009 369/124.1 |
| 2008/0013657 | A1 | 1/2008 | Aouine et al. | |
| 2008/0280582 | A1 * | 11/2008 | Su | H03G 3/345 455/297 |
| 2008/0291991 | A1 * | 11/2008 | Su | H04B 1/1646 375/232 |
| 2008/0309816 | A1 * | 12/2008 | Quan | H04N 5/913 348/441 |
| 2010/0285765 | A1 * | 11/2010 | Axtmann | H04B 1/1027 455/226.1 |
| 2010/0296560 | A1 * | 11/2010 | Sadan | H04B 3/56 375/222 |
| 2011/0154171 | A1 * | 6/2011 | Tran | G01R 31/31716 714/819 |
| 2011/0158360 | A1 * | 6/2011 | Pun | H04L 25/067 375/346 |
| 2011/0201290 | A1 * | 8/2011 | Miyagi | H04B 1/1027 455/226.1 |
| 2011/0207426 | A1 * | 8/2011 | Miyagi | H03G 3/345 455/296 |
| 2011/0249185 | A1 * | 10/2011 | Elsherif | H04N 5/211 348/572 |
| 2011/0261912 | A1 * | 10/2011 | Li | H03G 3/3078 375/350 |
| 2012/0026039 | A1 * | 2/2012 | Ganeshan | G01S 19/33 342/357.73 |
| 2012/0287077 | A1 * | 11/2012 | Pant | G06F 3/044 345/174 |
| 2013/0106652 | A1 * | 5/2013 | Leclercq | G01S 19/42 342/357.25 |
| 2013/0114571 | A1 * | 5/2013 | Das | H04W 24/10 370/336 |
| 2013/0148763 | A1 * | 6/2013 | Gunawardena | H04B 1/10 375/340 |
| 2014/0219454 | A1 * | 8/2014 | de Bont | G10L 21/0224 381/13 |
| 2015/0215142 | A1 * | 7/2015 | Shibata | H04L 27/142 375/319 |

OTHER PUBLICATIONS

"GNSS Receiver performance augmentation with a smart adaptive noise blanker in pulse-free environment", Dec. 3, 2014, Mathieu Cattenoz et al.

* cited by examiner

NOISE DISTRIBUTION SHAPING FOR SIGNALS, PARTICULARLY CDMA SIGNALS, WITH MITIGATION OF ARTIFACT SIGNALS

CROSS-REFERENCES TO RELATED APPLICATIONS

This application claims the benefit of the European patent application No. 15 003 562.4 filed on Dec. 15, 2015, the entire disclosures of which are incorporated herein by way of reference.

TECHNICAL FIELD

The invention relates to noise distribution shaping for signals, particularly for the application in receivers for CDMA signals.

BACKGROUND OF THE INVENTION

Interferences on radio signals such as CDMA (Code Division Multiple Access) signals emitted by satellites of a GNSS (Global Navigation Satellite System) particularly occur in impulse noise environments such as in the neighborhood of vehicle ignition systems, power lines, heavy current switches or microwave ovens. The interferences occurring in these environments are usually emitted in bursts and, thus, cannot be modelled as Gaussian.

In order to reduce the effects of pulsed interferences on the reception of a radio signal, a (noise) blanker can be applied in a signal receiver. The blanker sets received signal samples to zero when they contain high power pulsed interferences. The typical blanker uses two fixed thresholds BTH+ and BTH−, which are symmetrical to zero (|BTH+|=|BTH−|). If a received signal sample contains interferences and exceeds a threshold, the sample is set to zero by the blanker. Typical receivers for CDMA signals are equipped with such a blanker.

In the absence of interference, which may be for some signal receivers a frequent situation, the blanker still operates and sets the portions of a received signal to zero, which are affected by large thermal noise samples (usually modelled as Gaussian). However, this may lead to an undesired reduction of the Signal-to-Noise and Interference Ratio (SNIR).

U.S. Pat. No. 7,260,163 B2 describes a noise blanker for application with a FM signal receiver of a radio as installed in a vehicle. In order to reduce the effect of ignition noise on a received FM signal, a noise controller is provided, which uses an all-pole prediction algorithm to replace a noise-corrupted signal segment. The all-pole prediction algorithm takes a sample of a previously demodulated signal and models a new demodulated signal segment using the all-pole prediction algorithm. The algorithm uses a least means squared (LMS) algorithm to minimize error between the received original signal and the predicted signal.

European patent application no. 14290171.9, which is incorporated herein by reference and is considered as comprised in the state of the art according to Article 54(3) of the European Patent Convention, describes to offset either blanking thresholds or a received signal by an offset value. The main advantage of this blanking approach is seen in the suppression of the degradation of the SNIR of a received CDMA signal when there are no pulsed interferences and even an improvement of the SNIR. This blanking concept is also described in the publication "GNSS Receiver Performance Augmentation With a Smart Adaptive Noise Blanker in Pulse-Free Environment," Mathieu Cattenoz, Francis Soualle, "7th ESA Workshop on Satellite Navigation Technologies (NAVITEC)."" 3-5 Dec. 2014 at the European Space Research and Technology Centre (ESTEC) in Noordwijk, The Netherlands.

SUMMARY OF THE INVENTION

It is an object of the present invention to further develop the blanking approach described in the European patent application no. 14290171.9.

In the above referenced European patent application no. 14290171.9, it is proposed to offset the positive and negative blanking thresholds with respect to the sign and amplitude of the tracked chips of a received signal, particularly a CDMA signal of, for example, a GNSS. Particularly, it is proposed to apply a positive (resp. negative) offset during the full duration of the positive (resp. negative) "chip." This blanking approach assumes that a tracked signal is present, which is, of course, also the case for conventional receivers not applying the proposed adaptive blanking scheme. However, in contrast to conventional receivers, if the tracked signal disappears, for example if the receiver goes into a tunnel or the satellite transmitting the tracked signal goes below the horizon, then the adaptive blanker continues to apply the offset, as though the signal would be present while it is not. Despite the fact that after disappearance of the tracked signal the "received" signal is only constituted of noise samples, applying the offset thresholds of the blanking creates a sort of "artefact" or "ghost" signal which will be tracked by the receiver. To avoid this undesired situation, the present invention proposes to alert the adaptive threshold of the absence of a signal of interest (i.e., the signal to be tracked), and then to ignore the outputs of a receiver for further processing, or alternatively, to deactivate the adaptive blanker. In order to accomplish this, the present invention discloses method(s) used to detect the absence of signal and the "alerting" scheme. Thus, the solution of the problem of the disappearing of a tracked signal according to the present invention comprises detecting if a tracked signal or signal of interest is present, and if the signal of interest is not present, to ignore the outputs of the receiver (for example code and carrier phase estimates) for further processing, or alternatively to deactivate the adaptation of the blanking threshold which will result in applying a conventional blanking.

The present invention is based on the blanking approach described in the European patent application no. 14290171.9, which comprises offsetting either blanking thresholds or a received signal by an offset value. In particular, this offset value can depend on the amplitude of the received signal. For example, the amplitude of the received signal can be calculated based on the estimated power, Pest, of the received signal and its sign. Herein it is generally assumed that the amplitude of the signal can have a positive or a negative value. The offset value can be, for example, calculated by multiplying the square root of the estimated power with a predefined scaling factor α which can be positive or negative: α×sqrt(Pest). It has been found by the inventors that in case of CDMA signals, a scaling factor +1 or −1—so that the offset value is ±sqrt(Pest)—depending on the chip value, has advantageous effects.

This invention may be advantageously applied to signals with dominant noise content, such as CDMA coded signals, for example GNSS signals. The invention can be applied to signals before or after down-conversion into a baseband, for example after down-conversion and analog-to-digital conversion or directly after an analog-to-digital conversion before a down-conversion into a baseband. The invention can be applied to any kind of signal containing a significant proportion of noise.

Generally, an offsetting can be performed with the signal amplitude. In the special case of a CDMA signal, this offsetting can correspond to the chip amplitude ±sqrt(Pest) with a scaling factor $\alpha=\pm 1$. The most important aspect is that the noise is dominant, i.e., has much larger power than the received signal power P, and therefore to its estimate Pest. In case of received CDMA signals, at least one blanking threshold may be adapted depending on the estimated received power and the binary chip value of the received CDMA signals. The binary chip value of a CDMA signal is known by a CDMA signal receiver a priori since the spreading sequence used to code the CDMA signal is constituted of a sequence of chips, which has to be known by a receiver for decoding and despreading the CDMA signal. In the following, and in the particular case of a CDMA signal, the estimated chip amplitude is ±sqrt(Pest) while the binary chip value is ±1.

The adaption of the at least one blanking threshold depending on the binary chip values of received CDMA signals modifies the noise distribution of the output of a blanker of a CDMA signal receiver. Instead of adapting blanking thresholds, the samples of the CDMA signals may be adapted, for example offset; then, the adapted CDMA samples may be compared with fixed blanking thresholds, and the noise distribution of the sampled CDMA signals may be modified by applying blanking $\Delta n$ offsetting of the samples of CDMA signals may be performed by a value depending on the estimated chip amplitude of the CDMA signals. For example, the binary chip value scaled by the estimated amplitude of a received CDMA signal may be added or subtracted from samples of the received CDMA signal, according to the chip polarity. Those samples are then fed to the blanker with non-offset thresholds. After the blanking operation the offsetting of the samples of the CDMA signal can be removed.

Analytical and simulation work conducted for this invention has shown that this modification cannot only reduce the SNIR degradations caused by the blanking, but can even improve the SNIR by an optimized shaping of the noise distribution of a received CDMA signal.

Generally speaking, the invention extends from the concept of two blanking thresholds BTH+, BTH− with opposite values, as described above, to a set of N blanking thresholds BTH{i,k,n} which "cuts" regions of the distribution of samples of a received signal, and particularly a CDMA signal, at the input of a blanker to improve again the SNIR. Here, i is the index of the channel processing the ith signal source among I sources, k is a time index and n is a threshold index, among N thresholds. Indeed, in case of CDMA signals, for each tracked CDMA signal a different chip sequence also called replica is used and therefore a different threshold should be applied to each time instant. The different blanking thresholds BTH{i,k,n} do not have to be pairwise symmetrical with respect to zero for each signal i and time instant k, and their value can depend, for example, in case of CDMA signal on the chip amplitude. For example, a set of scaling factors $\alpha\{i,k,n\}$, which are functions of the received signal, time and threshold index, can be multiplied with the estimated power of the ith signal, so that the blanking thresholds are BTH{i,k,n}=$\alpha$ {i,k,n}×sqrt(Pest,i,k). In this former equation Pest depends on the received signal i and also of the time instant k.

Alternatively, it is also possible to consider a set of offset values applied to the received signal while keeping the blanking thresholds fixed. The set of offset values could depend on the signal i being tracked and on the time k. In that alternative implementation, the signal amplitude is offset by an offset value, while the blanking thresholds are kept fixed. The offset signal is fed to the blanker with non-offset thresholds. After blanking operation, the offset applied to the blanked signal can be removed.

The main advantage of the invention is the reduction of the degradation of the SNIR of a received CDMA signal when there are no pulsed interferences, and even an improvement of the robustness in case of synchronization errors caused, for example, by noise, dynamic or multipath.

It should be noted that the present invention can be applied to any kind of signals, particularly spread spectrum coded signals such as CDMA signals, particularly to BPSK (Binary Phase Shift Keying)- and BOC (Binary Offset Carrier)-modulated CDMA signals used by GNSS such as (NAVSTAR-)GPS (Global Positioning System) or the European GNSS Galileo. For BOC signals each chip with a single "plateau" (in case of for example a BPSK-modulated signal) is replaced by several smaller plateaus [+1,−1]. The present invention, which is presented for the transition of a, for example, BPSK-modulated signal single plateau, would apply to the transitions of the sub-plateaus of a BOC-modulated signal, or any other signal comprising transitions, like, for example, chirp radar signals, or continuous wave signals. In case of spread spectrum coded signals, the signal transitions are transitions between consecutive chips of a sequence of chips used for coding the signal. In the context of the present invention, a signal transition is generally understood as a transition between signal states in a time frame, like the transitions between bits, chips or symbols of a sequence of bits, chips or symbols respectively. Thus, signal transition can also occur between two consecutive signal states, particularly bits, chips or symbols, although of the same polarity, not even of different polarity.

An embodiment of the present invention relates to a method for noise distribution shaping for signals comprising the acts of receiving a signal of interest from a signal transmitter, detecting whether the received signal of interest is present, and if the received signal of interest is present iteratively performing the following steps of adapting the at least one blanking threshold or the received signal of interest according to an offset value depending on the amplitude of the received signal of interest, generating a blanking control signal by comparing the received signal of interest with the at least one blanking threshold, and modifying the noise distribution of the received signal of interest by applying blanking of the received signal of interest under control of the blanking control signal.

The act of detecting whether the received signal of interest is present may comprise one or more of the following acts: processing information from a line of sight signal detection and/or line of sight signal presence prediction, which outputs information on the presence of the received signal of interest; processing information from one or more further channels for processing received signals suitable for assessing the presence of the signal of interest.

The one or more further channels for processing received signals suitable for assessing the presence of the signal of interest may be formed by one or more of the following: an additional receiver channel for processing without an adaptive blanking another signal transmitted by the same transmitter as for the signal of interest for which the adaptive blanking is applied; an additional receiver channel for processing without adaptive blanking another component than the component for which adaptive blanking is applied of the signal of interest, when the signal of interest comprises multiplexed components; another receiver channel for processing without adaptive blanking the same signal of interest for which adaptive blanking is applied; a single receiver channel for processing the signal of interest with a specific control law for the activation and deactivation of adaptive blanking to detect the presence of the signal of interest.

The processing of information from the one or more further channels may comprise one or more of the following: performing a power estimation of a received signal; performing a Carrier-to-Noise ratio estimation of a received signal; estimating the jitter of the delay and/or phase tracking loops processing a received signal.

The processing of information from the one or more further channels may comprise detecting the presence of the signal of interest based on the power estimation of one or more received signals, the Carrier-to-Noise ratio estimation of one or more received signals, and/or the jitter estimation of the delay and/or phase tracking loops of one or more received signals.

The line of sight signal presence prediction may predict the presence of the received signal of interest by processing information on one or more of the following: the location of a transmitter of the received signal of interest, particularly the orbit of a GNSS satellite; obstructions between a transmitter of the received signal of interest and a receiver; an obstacle map containing information on obstacles between a transmitter of the received signal of interest and a receiver. This information can be received via an additional communication channel. For example, the information can be received from a server via a communication channel over a network connection with the server, for example an internet connection with an internet server.

The processing of the presence of the received signal of interest from information on obstructions between the transmitter of the received signal of interest and the receiver may comprise one or more of the following: determining the location of the receiver and determining from the location an obstruction for signal reception, particularly a bridge or tunnel on the determined receiver location, which can obscure reception of the signal of interest from a GNSS satellite; determining the position of a potential obstacle for signal reception and determining from the position a potential obstruction for signal reception, particularly the position of a solar panel of a GNSS satellite containing the receiver, which can obscure reception of the signal of interest by the GNSS satellite.

The act of detecting whether the received signal of interest is present may comprise the following acts of determining the power estimation and/or the Carrier-to-Noise ratio estimation and/or the jitter estimation of the delay and/or phase tracking loops of the received signal of interest over a predefined time period, either comparing at least one absolute value of the determined power estimation and/or Carrier-to-Noise ratio estimation and/or the jitter estimation of the delay and/or phase tracking loops with at least one profile of an expected power estimation and/or expected Carrier-to-Noise ratio estimation and/or expected jitter estimation of the delay and/or phase tracking loops of the signal of interest being received under nominal conditions, particularly known receiving conditions such as a stationary receiver, or comparing at least one variation value of the determined power estimation and/or Carrier-to-Noise ratio estimation and/or the jitter estimation of the delay and/or phase tracking loops of the signal of interest being received under varying conditions, particularly a receiver moving in an environment with unknown receiving conditions, with at least one threshold, and detecting that the received signal of interest is present if the at least one comparison results in either that the at least one absolute value is comprised by one or more of the at least one profile, or that the at least one variation value is below one or more of the at least one threshold.

The at least one profile of the expected power estimation and/or expected Carrier-to-Noise ratio estimation and/or expected jitter estimation of the delay and/or phase tracking loops may be determined based on the received signal of interest with a modified noise distribution by applying blanking of the received signal of interest under an adaptable control of the blanking control signal such that successive activations and deactivations of the adaptive blanking follow a known time-profile.

The at least one threshold may be determined based on the amplitude variations of the estimated Carrier-to-Noise ratio and/or estimated power and/or the estimated jitter of the delay and/or phase tracking loops, wherein the amplitude is obtained during a cycle of activation and deactivation of adaptive blanking.

A further embodiment of the invention relates to a computer program, which implements the method for noise distribution shaping for signals according to the invention and as described herein and enabling noise distribution shaping for signals according to the invention when executed by a computer. Such a computer program could be used by a computer equipped with a receiver comprising an antenna for receiving different signals, for example CDMA signals from satellites of a GNSS, enabling the computer to improve the SNIR of the received signals by applying the inventive noise blanking method.

According to a further embodiment of the invention, a record carrier storing a computer program according to the invention may be provided, for example a CD-ROM, a DVD, a memory card, a diskette, or a similar data carrier suitable to store the computer program for electronic access.

A yet further embodiment of the invention relates to a device for noise distribution shaping for signals comprising means for receiving a signal of interest from a signal transmitter, means for detecting whether the received signal of interest is present and generating a presence detection signal, means for generating a blanking control signal depending on the presence detection signal by comparing the received signal of interest with at least one blanking threshold, means for adapting the at least one blanking threshold or the received signal of interest according to an offset value depending on the amplitude of the received signal of interest, and means for modifying the noise distribution of the received signal of interest by applying blanking of the received signal of interest under control of the blanking control signal and depending on the presence detection signal.

The means for detecting whether the received signal of interest is present and generating a presence detection signal may be configured to perform the acts of the method of the invention and as described herein.

A yet further embodiment of the invention relates to a GNSS receiver circuitry comprising an analog to digital converter for generating samples of received CDMA signals, a plurality of noise distribution shapers for modifying the noise distribution of the sampled CDMA signals according to the invention and as described herein, and a GNSS signal processor for processing the sampled CDMA signals output by the noise distribution shapers and for outputting chip values of the processed CDMA signals.

These and other aspects of the invention will be apparent from and elucidated with reference to the embodiments described hereinafter.

The invention will be described in more detail hereinafter with reference to exemplary embodiments. However, the invention is not limited to these exemplary embodiments.

DETAILED DESCRIPTION OF THE PREFERRED EMBODIMENTS

Figure 1:
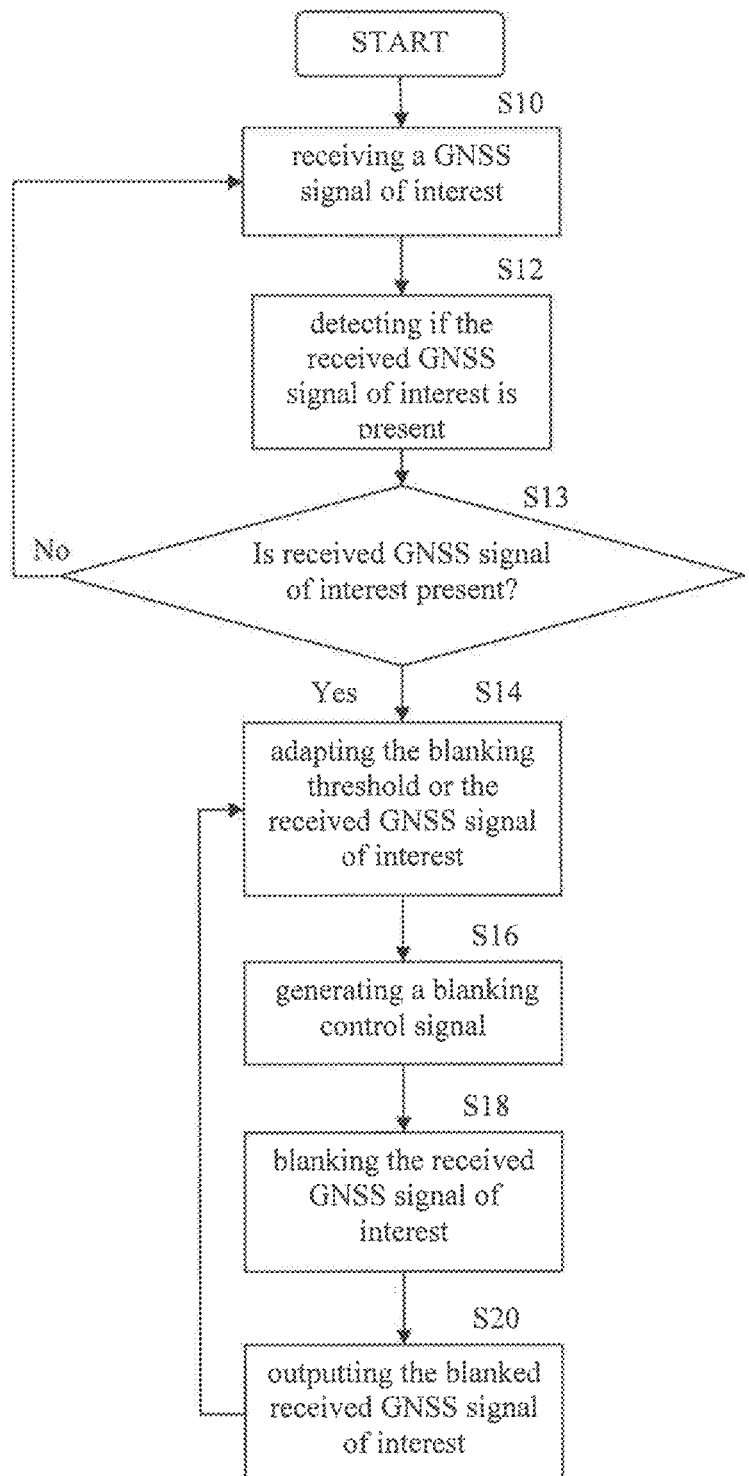
FIG. 1 shows a flowchart of a general embodiment of a method for noise distribution shaping for signals according to the invention.
Figure 2:
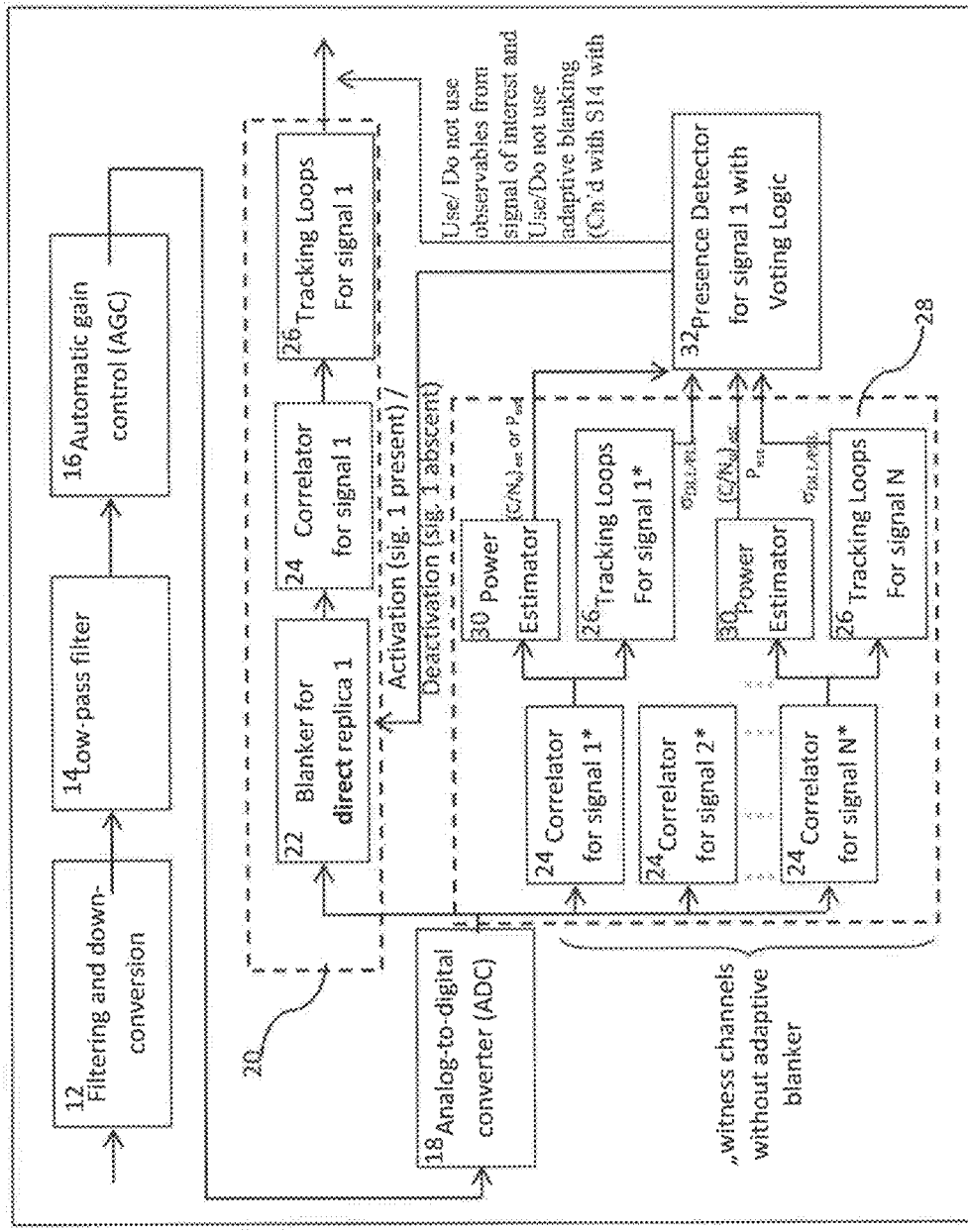
FIG. 2 shows an embodiment of a GNSS receiver circuitry with a noise distribution shaper and a detection of the presence or absent of a GNSS signal according to the invention.

In the following, functionally similar or identical elements may have the same reference numerals. Absolute values are shown below by way of example only and should not be construed as limiting the invention. Even if the following description of the invention is applied to CDMA signals of a GNSS, it should be noted that the invention can generally be applied to any kind of signal comprising transitions and is, therefore, not restricted to CDMA signals.

The blanking disclosed in the before mentioned European patent application no. 14290171.9 applies blanking thresholds BTH+ and BTH- with the following values:

$$BTH+ = \alpha \times (sqrt(Pest)) \times c(t) + B0$$

$$BTH- = \alpha \times (sqrt(Pest)) \times c(t) - B0$$

Where c(t) equals +1 or −1 according to the chip polarity, α is a scaling factor, for example, Pest is the estimated power, B0 the blanking threshold without offset (as for a conventional receiver). B0 can be set for example to 0.5× σnoise where σnoise represents the standard deviation for the thermal noise.

In the absence of a received signal or signal of interest, particularly if the signal disappears, both blanking thresholds BTH+ and BTH− could still be adapted, as though the signal of interest would be present, over a further period of time following the fading of the signal, whose duration depends on the update rate of the power estimation used to evaluate Pest or the actualization rate of the power estimation Pest if this one is brought by another channel, or another means for providing the power estimation. The magnitude, which is used to derive these thresholds, could be based on the last estimation of the signal amplitude, just before the signal of interest disappeared. In this case, no "collapse" in the Carrier-to-Noise Spectral Density Ratio (C/N0), or equivalently increase in the tracking error would occur, as it could have been expected for a receiver which does not apply the "adaptive blanker." Hence, the C/N0 is close to a value which corresponds to the expected C/N0, since the thresholds have been shifted of ±sqrt(Pest) where Pest is an estimation/prediction of the received signal power which leads to the expected C/N0 (without blanker). It must also be outlined that instead of being estimated with the physical line of sight, Pest can also be estimated with a simple algorithm accounting only for the geometry, for example the combination of an orbit propagator in case the transmitting source is a satellite, and a down link budget calculator, but ignoring any obstructions. Hence, by applying an estimated power which does not correspond to the actual one, due to the fading of the signal of interest, this is as though the receiver would track a "ghost" signal.

The main reason for this surprising but understandable result is that the derived theory for the (C/N0) and GNSS receiver improvement by the means of an offsetting of the blanking thresholds is based on the assumption that the signal of interest is present (conditional probability). Therefore, this condition needs to be fulfilled and the objectives of the present invention are on one side to verify the presence of the signal of interest and on the other side to activate the adaptive blanker when the signal is present and use the outputs of the receiver channel applying the adaptive blanker, or to ignore the outputs of the receiver channel applying the adaptive blanker and possibly also deactivating the blanker when the signal of interest is absent which leads to a conventional use of the blanker with symmetrical thresholds.

FIG. 1 shows the flowchart of a general embodiment of a method for noise distribution shaping for GNSS signals, according to the invention, applying a blanking depending on a signal of interest detection, which can be implemented as a computer program to be executed by a processor. The term "steps" used in the following description does not mean that the steps are performed in a certain sequence, since the single steps can also be performed in parallel. Thus, "steps" must be understood as "acts performed by the method." In step S10, the method receives a GNSS signal of interest. In the following step S12, the method detects if the received GNSS signal of interest is present, particularly with methods as described later in detail. In step S13, the method checks whether the received GNSS signal of interest is present. If so, the method continues with step S14. If step S13 determines that the received GNSS signal of interest is no longer present, the method returns to step S10. Alternatively to returning to step S10, it is also possible to deactivate the adaptive blanking, particularly by setting the thresholds back to conventional symmetrical values resulting in a conventional use of the blanker. Step S14 and the following steps S16, S18, and S20 perform a blanking of the received GNSS signal of interest: step S14 adapts one or more blanking thresholds of the received GNSS signal of interest, step S16 generates a blanking control signal, step S18 performs the blanking of the received of interest, and step S20 outputs the blanked received GNSS signal of interest. Steps S14 to S20 are iteratively performed. It should be noted that the steps of the method shown by the flowchart of FIG. 1 are performed in parallel, i.e., the method continuously receives a GNSS signal of interest and checks its presence in the steps S10 to S13 in parallel to the blanking steps S14 to S20. Thus, the steps S10 to S13 can be performed in parallel to the steps S14 to S20. The steps S14 to S20 are however only performed if step S13 determines that the received GNSS signal of interest is still present.

For the detecting of the presence of a signal of interest in step S12, the present invention proposes several methods, such as using information from a "Line Of Sight" signal presence predictor whose role is to inform on the presence or absence of the signal of interest, or additionally or alternatively using other methods which make use on the outputs of the adaptive blanker and to infer on the presence or absence of the signal of interest. These other methods can be based on using the information from other channels which do not apply the adaptive threshold, and processing either another signal which is not multiplexed with the signal of interest for which adaptive blanker is applied but which is still transmitted by the same source, or another signal component which is multiplexed with the component of the signal of interest for which adaptive blanker is applied and transmitted by the same source, and which consequently do not create any artefact to give the confirmation of the presence or absence of the signal of interest.

Particularly, the invention proposes the following variants of other methods for signal of interest presence detection:

For transmission sources which transmit several signals simultaneously, in different frequency bands, like the Galileo E1 signals transmitted at carrier 1575.42 MHz, or the Galileo E5 signals at carrier 1191.795 MHz multiplexing the following four components E5a-I Data component, E5a-Q Pilot component, E5b-I Data component and E5b-Q Pilot component, or for multiplexed signals, like the Galileo E1-Open Service signals which combine a Pilot E1-C and a Data E1-B component, it is proposed to use the power estimation and/or the Carrier-to-Noise ratio estimation and/or the jitter estimation of the delay and/or phase tracking loops of the channel for one or several of the Galileo E5 components, for example the E5a-I Data component, or the E1-B Data component, which would not apply the adaptive threshold, to inform the receiver channel processing the E1-C Pilot component, which would apply the adaptive threshold, of the presence or absence of the multiplexed signal (if the E5a-I Data component, or the E1-B Data component is present (resp. absent), the E1-C Pilot component will also be present (resp. absent) since both signals are transmitted simultaneously).

For signals having a single component, it is proposed to create a second channel tracking the same signal but without adaptive blanking threshold. As for the previous case, this second channel, not influenced by the artefact effect could then be used to "inform" the first channel applying the adaptive blanker of the presence or absence of the signals. This solution of course would lead to a doubling of the hardware resources.

An alternative less consuming in terms of hardware resources, for signals having a single component, comprises deactivating the adaptive blanking threshold from time to time, and monitoring the corresponding correlator output to observe a possible collapse which would be symptomatic of the absence of the signal. Here a periodical activation/deactivation profile of the adaptive blanker could be proposed. Now, the corresponding deactivation period should not be too large with respect to the activating period in order to still maintain the performance improvement brought by the adaptive blanking threshold.

In the following, embodiments of signal presence detection methods proposed and applied by the present invention are discussed in detail. Two main categories of methods are foreseen to attest about the presence of the signal of interest:

Category 1: Methods which are not specific to the proposed invention (Method 1). Here any method, belonging to the state of the art and which can help proving information on the presence or not of the signal of interest is considered.

Category 2: Methods which make use of the proposed invention and especially on the property of the expected (C/N0) estimation and/or of the expected power estimation and/or the expected delay estimation of the code or phase tracking jitter when the adaptive blanker is applied (Methods 2, 3 and 4).

The first category of methods is based on a strong knowledge of the presence or not of the signal of interest. One can cite the following examples:

For applications where the presence of the CDMA signals to be processed is scheduled and can be anticipated, then it is also possible to schedule the activation or deactivation of the adaptive blanker. For example, when considering a GNSS receiver on-board a satellite that needs to process CDMA signals transmitted by, e.g., GPS or Galileo satellites. In such a configuration the obstruction of the GPS or Galileo signals due to the local environment (solar panels) can be considered as predictable. Furthermore, since the orbits of the satellite and GPS or Galileo satellites, as well as the earth obstructions are easily predictable, then it is possible to activate or de-activate the blanker according to the "a priori" on the presence of the GPS and Galileo signals.

This example is generic for any application where presence of the signals or eventual obstructions can be predicted (train on a rail-way with bridges whose position is known, etc.). This is also the case of static receivers like GNSS receivers, which are located in sites free of obstructions (no trees, no buildings . . . ). Here again it is possible to anticipate the rising and setting of GPS or Galileo satellites, and consequently, to anticipate their presence. Again the activation or deactivation of the adaptive blanker can be predicted.

For the second category it is proposed to make use on the monitoring of the (C/N0) or any representative figure of merit of the GNSS receiver (power detector, jitter of the phase or code delay lock loops) to attest on the presence of the CDMA signals. Here different situations will be proposed.

It is possible to infer on the presence or not of the signal of interest thanks to a channel which does not use any threshold like for a conventional receiver and which would process (Method 2 and 4):

either the same signal as the one processed with the adaptive channel or another signal which is multiplexed with the signal processed with the adaptive channel (like the Galileo E1-OS Data component for the Galileo E1-OS signal multiplexing one Pilot and one Data component).

or another signal which is transmitted simultaneously to the signal processed with the adaptive channel, but which is not obligatory multiplexed to the signal processed with the adaptive blanker (like the Galileo E1-OS Pilot component, and one of the Galileo E5 signal components). It must be noted that several signals transmitted in the same frequency band do not have to be multiplexed, if they use independent transmission chains, for example.

This additional channel serves as "witness" for the presence of the signal of interest, by using a rapid collapse of the estimated (C/N0) or the estimated power or alternatively an increase of the tracking jitter. This information could then be used to deactivate the adaptive blanker.

In the following, a method based on the combination of (C/N0) for channels applying the adaptive blanker and channels not applying the adaptive blanker is described in detail (Method 2)

Figure 3:
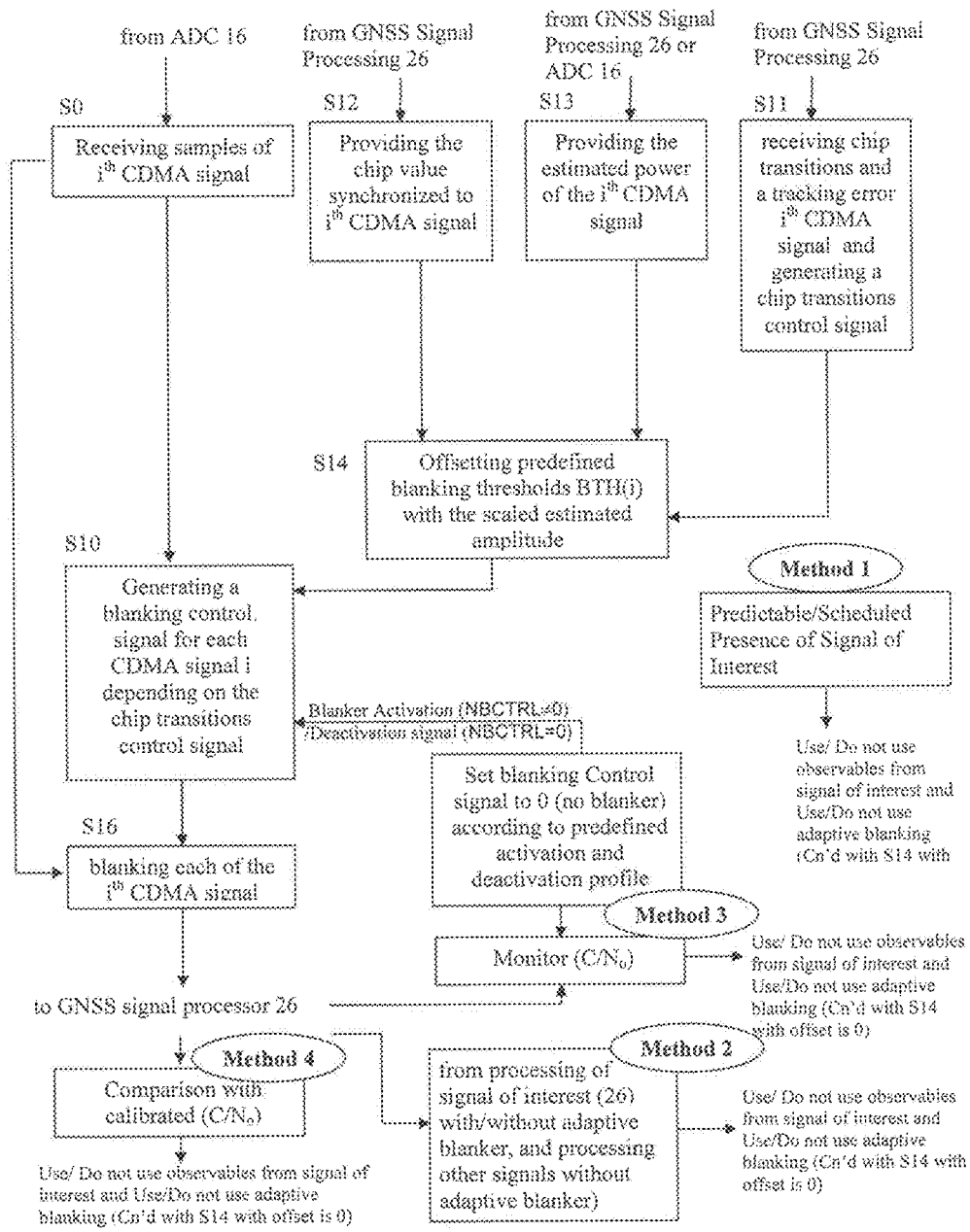
FIG. 3 shows a flow chart of an embodiment of a noise distribution shaping method for CDMA signals according to the invention.

FIG. 3 represents the main functional blocks of an embodiment of a GNSS receiver circuitry 10 with a noise distribution shaper and a detection of the presence or absence of a GNSS signal according to the invention from the antenna output to the correlator whose output is used for both signal tracking and demodulation. The output signal of the antenna is in block 12 firstly filtered at RF to reduce the effects of potential out-of-band interferers, and to preserve thus the Low-Noise Amplifier (LNA) or other components of the receiver front-end. Then the signal is amplified in block 12 in an LNA with a minimal degradation of the receiver noise figure and low pass filtered in block 14. After down-conversion and filtering (several filtering stages, not shown here, at intermediate frequencies (IF) can take place in a standard receiver), the signal is fed to an Automatic Gain Control (AGC) 16. This guarantees that the amplitude of the received signal is adapted to the dynamic of an Analog-to-Digital Converter (ADC) 18 in order to minimize the quantization losses. For the ADC 18, 2N quantization levels are considered and all samples beyond the maximal levels (±2N−1) are clipped.

The digitized output signal of the ADC 18 is supplied to several "processing channels" 20 and 28 in parallel. A first "processing channel" 20 shows the channel for the signal 1, with the application of an adaptive blanker 22. The other additional "processing channels" 28 do not apply any adaptive blanker and are used for the detection of the presence or absence of the signal 1 of interest. Here, parameters like the (C/N0) estimator, power estimator, or the jitter of the Delay and Phase tracking loops can be used for the detection. Not applying the adaptive blanker means that no offset is applied and that the detection thresholds are set at a very high value in such a way that samples are zero only in case of strong interferences (conventional application of blanker as mitigation against powerful and pulsed interferences). Each one of the "processing channels" comprises a correlator 24 and tracking loops 26 as conventional GNSS receivers. Each one of the additional "processing channels" 28 comprises a power estimator 30 for estimating the power of the output signal of the respective correlator 24. Instead of a power estimator, a (C/N0) estimator or jitter of the Delay and Phase tracking loops can be applied. The outputs of the power estimators 30 are supplied to a presence detector with voting logic 32, which generates a blanking activation/deactivation signal fed to the blanker 22. The presence detector with voting logic 32 detects the presence (or absence) of the signal 1 based on the power estimations of signal 1*, 2* to N* (or (C/N0) estimations or jitter of Delay and Phase tracking loops) and generates the blanking activation/deactivation signal depending on the signal 1 presence/absence detection.

This signal 1* is identical to the signal 1 (processed by the channel 20 with adaptive blanker) or any another signal component transmitted by the same satellite as the signal 1 (if signal 1 is the Galileo E1-Pilot component, for example the signal 1* would be Galileo E1-Data component, or alternatively the Galileo E5a-I, or E5a-Q, or E5b-I or E5b-Q components). The other signals 2* to N* do not originate obligatory from the same satellite or signal source as the signal 1. At least a single "additional" channel without adaptive blanker and identical to the signal 1 or any another signal component transmitted by the same satellite as the signal 1 is used (Signal 1*). But in case of a severe interference, the (C/N0) for this additional channel would reduce and the tracking jitter of the Delay and Phase tracking loops would increase too. The corresponding "symptoms" are the same as the ones for the presence or absence of the signal and a wrong decision regarding the presence of the signal 1 could be taken: a (C/N0) would be interpreted as the absence of signal (bridge) while in fact the signal 1 is still present but buried into interference. Therefore, several channels tracking not only the signal 1 of interest but also other signals (transmitted by other satellites) can be applied according to the invention. Indeed, an interferer would affect the estimated (C/N0), the estimated power and the jitter of the Delay and Phase tracking loops of all channels, while if the signal 1 disappears (satellite below the horizon) only its estimated (C/N0), its estimated power and estimated jitter of the Delay and Phase tracking loops would be affected, and not the ones for the other signals.

It should be noted also that for the proposed example a combined monitoring of the (C/N0) for both signal 1 with monitoring and signal 1* without monitoring can also provide information on the presence of interference or obstruction: for an interference both (C/N0) would be reduced with the same value, while for an obstruction the (C/N0) for the signal 1* would collapse and the (C/N0) for the signal 1 would reduce by several (possibly tenth of) dB.

These different options highlight that from the different "witness" channels which do not apply the adaptive blanker, a "voting logic" regarding the presence or not of the signal 1 of interest can be applied according to the invention in order to detect the presence of signal 1.

In the following, a method based on the monitoring of the (C/N0) for activation and deactivation of the adaptive blanker over time is described in detail (Method 3)

An alternative method proposed to detect the presence or not of the signal comprises using the same channel and deactivating the adaptive blanker at given times. Here only one channel would be necessary when compared to the former method. Thus, by monitoring the variations of the (C/N0) or estimated power or tracking jitters of the Delay and Phase tracking loops during the deactivations and activations of the adaptive blanker, it is possible to detect if the signal of interest is present. Instead of a periodical activation and deactivation cycle of the adaptive blanker, it is also possible to consider a non-periodical activation and deactivation cycle of the adaptive blanker but rather pseudo-random pattern which is known only from receiver.

If it appears that the absolute value of the monitored (C/N0) or power or jitter of the Delay and Phase tracking loops varies according to an expected profile under nominal conditions, particularly known receiving conditions such as a stationary receiver during the deactivation and activation cycle, it means that the signal is present. A profile for the expected value of the (C/N0) or power or jitter of the Delay and Phase tracking loops can namely be pre-calibrated under such nominal conditions. If the monitored (C/N0) or power or jitter of the Delay and Phase tracking loops does not belong to this profile during the deactivation and activation cycle it means that the signal is not present ("ghost signal" scenario). In that case the corresponding GNSS observables (code, phase estimates from the loops) would not be used for further processing (Positioning in case of GPS applications).

If it appears that the monitored (C/N0) or power or jitter of the Delay and Phase tracking loops varies according to the expected improvement brought by the adaptive blanker during the deactivation and activation cycle, it means that the signal is present. The amplitude of variations for the (C/N0) estimation or power estimations or jitter estimation of the Delay and Phase tracking loops corresponds to the possible benefit that can be obtained by the application of the inventive adaptive blanking. The receiver performances alternate between improved with adaptive blanker and not improved as for a conventional receiver. A threshold which could be derived from a pre-calibration performed by the receiver manufacturer and based on this expected amplitude variation would enable the detection of the presence of the signal of interest. If the monitored (C/N0) or power or jitter of the Delay and Phase tracking loops varies strongly, possibly tenth of dBs, during the deactivation and activation cycle it means that the signal is not present ("ghost signal" scenario). In that case the corresponding GNSS observables (code, phase estimates from the loops) would not be used for further processing (Positioning in case of GPS applications).

In the following, a method based on the comparison of (C/N0) with adaptive blanker with a calibrated (C/N0) is described in detail (Method 4).

Another method based on the application of the adaptive blanker, to attest on the presence or absence of the signal of interest considers that the absolute (C/N0) "profile" or estimated power "profile" or equivalently the tracking jitters of the Delay and Phase tracking loops variations over time are known. A simple example is given in the case of a constant distance between the signal source (for example a pseudolite) and the receiver. In that case, since the distance is known, it is possible to calibrate the expected (C/N0) which is just derived by the simple signal propagation laws, or can be even measured. Interruptions of the (C/N0) would be, for example, caused by the crossing of objects between transmitter and receiver. The proposed method based on the comparison between the actual (C/N0) with adaptive blanker and a calibrated profile, works as long as no interference occurs, except if the use of other channels tracking other signals that the signal of interest for which (C/N0) would also decrease in case of interference and would help inferring on the presence of the signal of interest for the channel applying the adaptive blanker.

FIG. 3 shows a flowchart of a method for noise distribution shaping for any of I CDMA signals according to the invention, which can be implemented as a computer program to be executed by a processor. The term "steps" used in the following description does not mean that the steps are performed in a certain sequence, since the single steps can also be performed in parallel. Thus, "steps" must be understood as "acts performed by the method."

The method receives in step S0 digitized CDMA signal samples of the ith CDMA signal from the ADC 16. In step S12, the chip values of the ith CDMA signal are provided, which are known a priori and stored in a memory. In step S13 the ith CDMA signal from the ADC 16 is provided in order to estimate the power of the ith received signal. The scaled estimated chip amplitudes are then used in step S14 to offset predefined blanking thresholds BTHpre(i) to generate a set of blanking thresholds BTH+(i) and BTH−(i) for each CDMA signal. With the set of blanking thresholds BTH(i) and the received digitized CDMA signal samples, the method generates in step S10 a blanking control signal for each CDMA signal i. The blanking control signal generation in step S10 is controlled by one or more blanker activation/deactivation signals generated by method 3 for signal presence detection as described above. In step S16, the noise distribution of the received samples of the ith CDMA signal is shaped by a blanking process controlled by the ith blanking control signal generated in step S10. The CDMA signal samples with shaped noise distribution are finally output to a GNSS signal processor for further processing. Also, the CDMA signal samples can be input to method 2 and/or method 3 and/or method 4 for signal presence detection as described above. For method 1, the "a priori" knowledge of the Transmitter-Receiver geometry enables to directly accept or reject the observables provided by the channel with activation, or alternatively to configure the blanker as a conventional blanker without adaption of the blanking threshold, by setting the threshold offset to 0.

The present invention allows reducing the degradation of the SNIR of a received signal when this one is present, particularly a CMDA signal, when there are no pulsed interferences, by offsetting the blanking thresholds or the signal depending on the amplitude of the signal, for example with the scaled amplitude (the amplitude can be positive or negative according to the chip value) of a received CDMA signal, and by comparing the amplitude (algebraic value) of samples of the received signal to the blanking thresholds. The present invention avoids further processing the correlator outputs of the channel applying the adaptive blanker when the signal of interest is absent and avoid in that way the creating of an "artefact" signal of interest. The present invention can be used for receivers for navigation and communication applications. In general, the invention is for interest for all terrestrial or space based applications in telecommunication for all kinds of signal transmissions buried in high level noise.

At least some of the functionality of the invention may be performed by hard- or software. In case of an implementation in software, a single or multiple standard microprocessors or microcontrollers or signal processors may be used to process a single or multiple algorithms implementing the invention. In case of an implementation in hardware, particularly an ASIC (Application Specific Integrated Circuit) or a (F)PGA ((Field) Programmable Gate Array) can be used to implement the present invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS AND ACRONYMS

10 GNSS receiver circuitry
12 filtering and down-conversion
14 low pass filter
16 AGC
18 ADC
20 first processing channel
22 adaptive blanker
24 correlator
26 tracking loops
28 additional processing channels
30 power estimator
32 presence detector with voting logic
ADC Analog to Digital Converter
AGC Automatic Gain Control
BTH Blanking Threshold
CDMA Code Division Multiple Access
C/N0 Carrier-to-Noise Spectral Density Ratio
GNSS Global Navigation Satellite System
DLL Delay Locked Loop
LNA Low Noise Amplifier
NBCTRL Noise Blanking Control
PLL Phase Locked Loop
RF Radio Frequency
SNIR Signal-to-Noise and Interference Ratio

The invention claimed is:
1. A method for noise distribution shaping for signals comprising:
receiving a signal of interest from a signal transmitter;

detecting whether the received signal of interest is present, wherein the act of detecting whether the received signal of interest is present comprises the following acts of:
determining at least one of a power estimation, the Carrier-to-Noise ratio, or jitter variations of the received signal of interest over a predefined time period,
at least one of:
comparing at least one absolute value of at least one of the determined power estimation, Carrier-to-Noise ratio, or jitter estimation of at least one of a delay or phase tracking loops, either with at least one profile of at least one of an expected power estimation, expected Carrier-to-Noise ratio, or expected jitter estimation of at least one of the delay or phase tracking loops of the signal of interest being received under nominal conditions, or
comparing at least one variation value of the determine power estimation, Carrier-to-Noise ratio, or jitter estimation of at least one of the delay or phase tracking loops of the signal of interest being received under varying conditions with at least one threshold, and
detecting that the received signal of interest is present if the comparison results in either that the at least one absolute value is comprised by one or more of the at least one profile, or that the at least one relative variation value is below one or more of the at least one threshold; and
if the received signal of interest is present iteratively performing the following steps of
adapting at least one blanking threshold or the received signal of interest according to an offset value depending on the amplitude of the received signal of interest,
generating a blanking control signal by comparing the received signal of interest with the at least one blanking threshold,
modifying the noise distribution of the received signal of interest by applying blanking of the received signal of interest under control of the blanking control signal, and
outputting the blanked received signal of interest.

2. The method of claim 1, wherein the act of detecting whether the received signal of interest is present comprises one or more of the following acts:
processing information from at least one of a line of sight signal detection line of sight signal presence prediction, which outputs information on the presence of the received signal of interest;
processing information from one or more further channels for processing received signals suitable for assessing the presence of the signal of interest.

3. The method of claim 2, wherein the one or more further channels for processing received signals for assessing the presence of the signal of interest are formed by one or more of the following:
an additional receiver channel for processing without adaptive blanking another signal transmitted by the same transmitter as for the signal of interest for which the adaptive blanking is applied;
an additional receiver channel for processing without adaptive blanking another component than the component for which adaptive blanking is applied of the signal of interest, when the signal of interest comprises multiplexed components of different channels;
another receiver channel for processing without adaptive blanking the same signal of interest for which adaptive blanking is applied;
a single receiver channel for processing the signal of interest with a specific control law for the activation and deactivation of adaptive blanking to detect the presence of the signal of interest.

4. The method of claim 2, wherein the line of sight signal presence prediction predicts the presence of the received signal of interest from information on one or more of the following:
the location of a transmitter of the received signal of interest, particularly the orbit of a GNSS satellite;
obstructions between a transmitter of the received signal of interest and a receiver;
an obstacle map containing information on obstacles between a transmitter of the received signal of interest and a receiver.

5. The method of claim 4, wherein the processing of the presence of the received signal of interest from information on obstructions between the transmitter of the received signal of interest and the receiver comprises one or more of the following:
determining the location of the receiver and determining from the location an obstruction for signal reception which can obscure reception of the signal of interest from a GNSS satellite;
determining the position of a potential obstacle for signal reception and determining from the position a potential obstruction for signal reception which can obscure reception of the signal of interest by the GNSS satellite.

6. The method of claim 5, wherein the step of determining the location of the receiver and determining from the location an obstruction for signal reception comprises determining the location of at least one of a bridge or tunnel.

7. The method of claim 5, wherein the step of determining the position of a potential obstacle for signal reception by the GNSS satellite comprises determining the position of a solar panel of a GNSS satellite containing the receiver.

8. The method of claim 1, wherein the at least one profile of at least one of the expected power estimation, Carrier-to-Noise ratio, or jitter estimation of at least one of the delay or phase tracking loops is determined based on the received signal of interest with a modified noise distribution by applying blanking of the received signal of interest under an adaptable control of the blanking control signal such that successive activations and deactivations of the adaptive blanking follow a known time-profile.

9. The method of claim 1, wherein the at least one threshold is determined based on the amplitude variations of at least one of the estimated Carrier-to-Noise ratio, estimated power, or the estimated jitter of at least one of the delay or phase tracking loops, wherein the amplitude is obtained during a cycle of activation and deactivation of adaptive blanking.

10. A computer program stored on a non-transitory medium comprising executable instructions for implementing the method of claim 1 when the computer program is executed on one or more computing devices.

11. A non-transitory computer readable record carrier storing a computer program according to claim 10.

12. A method for noise distribution shaping for signals comprising:
receiving a signal of interest from a signal transmitter, detecting whether the received signal of interest is present, wherein the act of detecting whether the received signal of interest is present comprises the following acts of:
    determining at least one of a power estimation, the Carrier-to-Noise ratio, or jitter variations of the received signal of interest over a predefined time period,
    at least one of:
        comparing at least one absolute value of at least one of the determined power estimation, Carrier-to-Noise ratio, or jitter estimation of at least one of a delay or phase tracking loops, either with at least one profile of at least one of an expected power estimation, expected Carrier-to-Noise ratio, or expected jitter estimation of at least one of the delay or phase tracking loops of the signal of interest being received under nominal conditions, or
        comparing at least one variation value of the determine power estimation, Carrier-to-Noise ratio, or jitter estimation of at least one of the delay or phase tracking loops of the signal of interest being received under varying conditions with at least one threshold, and
detecting that the received signal of interest is present if the comparison results in either that the at least one absolute value is comprised by one or more of the at least one profile, or that the at least one relative variation value is below one or more of the at least one threshold; and
    if the received signal of interest is present iteratively performing the following steps of
        adapting the received signal of interest according to an offset value depending on the amplitude of the received signal of interest,
        generating a blanking control signal by comparing the received signal of interest with the at least one blanking threshold,
        modifying the noise distribution of the received signal of interest by applying blanking of the received signal of interest under control of the blanking control signal,
wherein the act of detecting whether the received signal of interest is present comprises one or more of the following acts:
    processing information from at least one of a line of sight signal detection line of sight signal presence prediction, which outputs information on the presence of the received signal of interest;
    processing information from one or more further channels for processing received signals suitable for assessing the presence of the signal of interest,
    wherein the processing of information from the one or more further channels comprises one or more of the following:
    performing a power estimation of a received signal;
    performing a Carrier-to-Noise ratio estimation of a received signal;
    estimating a jitter of the delay and/or phase tracking loops processing a received signal.

13. The method of claim 12, wherein the processing of information from the one or more further channels comprises detecting the presence of the signal of interest based on at least one of:
    the power estimation of one or more received signals,
    the Carrier-to-Noise ratio estimation of one or more received signals, or
    the jitter estimation of at least one of the delay or phase tracking loops of one or more received signals.

14. A device for noise distribution shaping for signals comprising:
    means for receiving a signal of interest from a signal transmitter,
    means for detecting whether the received signal of interest is present and generating a presence detection signal, wherein the act of detecting whether the received signal of interest is present comprises the following acts of:
        determining at least one of a power estimation, the Carrier-to-Noise ratio, or jitter variations of the received signals of interest over a predefined time period,
        at least one of:
            comparing at least one absolute value of at least one of the determined power estimation, Carrier-to-Noise ratio, or jitter estimation of at least one of a delay or phase tracking loops, either with at least one profile of at least one of an expected power estimation, expected Carrier-to-Nose ratio, or expected jitter estimation of at least one of the delay or phase tracking loops of the signal of interest being received under nominal conditions, or
            comparing at least one variation value of the determine power estimation, Carrier-to-Noise ratio, or jitter estimation of at least one of the delay or phase tracking loops of the signal of interest being received under varying conditions with at least one threshold, and
        detecting that the received signal of interest is present if the comparison results in either that the at least one absolute value is comprised by one or more of the at least one profile, or that the at least one relative variation value is below one or more of the at least one threshold;
    means for generating a blanking control signal depending on the presence detection signal by comparing the received signal of interest with at least one blanking threshold,
    means for adapting at least one blanking threshold or the received signal of interest according to an offset value depending on the amplitude of the received signal of interest,
    means for modifying the noise distribution of the received signal of interest by applying blanking of the received signal of interest under control of the blanking control signal and depending on the presence detection signal, and
    means for outputting the blanked received signal of interest.

15. The device of claim 14, wherein the means for detecting whether the received signal of interest is present and generating a presence detection signal are configured to perform the acts of:
    processing information from at least one of a line of sight signal detection line of sight signal presence prediction, which outputs information on the presence of the received signal of interest; and
    processing information from one or more further channels for processing received signals suitable for assessing the presence of the signal of interest.

16. A GNSS receiver circuitry comprising:
    an analog to digital converter for generating samples of received CDMA signals, a plurality of noise distribution shapers for modifying the noise distribution of the sampled CDMA signals according to claim 14, and
a GNSS signal processor for processing the sampled CDMA signals output by the noise distribution shapers and for outputting chip values of the processed CDMA signals.

\* \* \* \* \*